United States Patent Office 3,781,342
Patented Dec. 25, 1973

3,781,342
PRODUCTION OF TERTIARY ALKYL SUBSTITUTED ORTHO-TOLUIC ACIDS AND ESTERS THEREOF
Bernard S. Friedman and Steven B. Nason, Chicago, Ill., assignors to Atlantic Richfield Company, Los Angeles, Calif.
No Drawing. Filed Mar. 14, 1973, Ser. No. 340,990
Int. Cl. C07c 63/04
U.S. Cl. 260—515 R                    9 Claims

ABSTRACT OF THE DISCLOSURE

Preparation of tertiary alkyl derivatives of ortho-toluic acid and the lower alkyl esters thereof is accomplished by carbonylating a branched olefin with carbon monoxide in the presence of a mineral acid catalyst and heating the resulting carbonylate and the ortho-toluic acid or lower alkyl ester thereof to obtain carbon monoxide and a tertiary alkyl derivative of ortho-toluic acid or ester thereof.

BACKGROUND OF THE INVENTION

The products obtained by the method of this invention are commercially useful, for example, the tertiary alkyl toluic acid can be esterified or the esters produced directly, which compounds are suitable for plasticizers, coatings and films.

The alkylation of ortho-toluic acid or its lower alkyl esters to give a tertiary alkyl derivative is exceedingly difficult since isobutylene or other tertiary-cationic precursors tend to polymerize at the high temperatures required for the alkylation of such compounds. It is known, of course, from U.S. Pat. No. 3,403,195 that tertiary butyl meta-xylene can be produced by reacting isobutylene with hydrogen chloride dissolved in meta-xylene to form tertiary butyl chloride with the tertiary butyl chloride which is formed in situ, then being employed to alkylate the meta-xylene. It is also possible to tertiary alkylate ortho-toluic acid to a very minor extent by treating it with tertiary butyl chloride at room temperature in the presence of sulfuric acid catalyst. The yield is generally of the order of only 5 percent. Similarly, isobutanol and 95 percent sulfuric acid gives a very low yield of the tertiary butyl derivative.

The present invention provides a method for the tertiary alkylation of ortho-toluic acid and its lower alkyl esters wherein yields of 40 percent or more are obtainable.

SUMMARY OF THE INVENTION

In accordance with the present invention an olefin such as isobutylene, isoamylene, methylcyclopentene or methylcyclohexene is reacted with carbon monoxide in the presence of a mineral acid catalyst at temperatures of from 0 to 60° C. to give the corresponding carbonylate (acyloxy cation) which is then reacted at a temperature of from about 60° C. to 150° C. with ortho-toluic acid or a lower alkyl ester of such acid to produce the corresponding alkylated aromatic compound and carbon monoxide.

It is an object of this invention therefore to tertiary alkylate ortho-toluic acid or the lower alkyl esters thereof.

It is another object of this invention to provide a method for the production of tertiary alkyl derivatives of ortho-toluic acid or the lower alkyl esters thereof from isobutylene, isoamylene, methylcyclopentene or methylcyclohexene.

Other objects of this invention will be apparent from the following description of the invention and from the claims.

DESCRIPTION OF THE INVENTION

The aromatic compounds which can be tertiary alkylated in accordance with the method of this invention are ortho-toluic acid or the lower alkyl esters of such acids wherein the lower alkyl portion of the ester contains from 1 to 4 carbon atoms, for example, the methyl, ethyl, propyl, isopropyl, butyl or isobutyl esters.

The branched olefins which are carbonylated to produce the carbonylate used in the alkylation reaction are isobutylene, isoamylene, methylcyclopentene and methylcyclohexene. Useful isomers of methylcyclohexene include 4-methylcyclohexene-1.

Although any mineral acid catalyst may be employed, sulfuric acid and hydrofluoric acid are preferred. In general it is preferred to employ concentrated mineral acid with the acid concentration being in the range of from 90 to 100 percent with from about 2 to 20 moles of catalyst per mole of olefin. The carbonylation temperatures can range from 0° C. to 60° C. with from 0° C. to 30° C. being preferred. In general with the higher acid concentration, for example, 95 to 100 percent acid, fewer moles and lower temperatures can be employed, although the concentration does not markedly change the reaction conditions required.

The carbonylation reaction can generally be carried out at times ranging from 10 to 30 minutes, although this is not critical and longer times may be employed. The carbonylation can be carried out at pressures ranging from atmospheric to 2000 p.s.i.g., with pressures from 15 to 100 p.s.i.g. being preferred.

After the carbonylation reaction has been completed, the carbonylate is reacted with the ortho-toluic acid or the ester at temperatures ranging from 60° C. to 150° C. with from about 70° C. to 100° C. being preferred. The reaction time is preferably from 1 to 4 hours; however, longer times may be employed if temperatures in the lower end of the range are used. Since the same mineral acid can be employed as the alkylation catalyst, the carbonylation reaction can be carried out in the presence of the ortho-toluic acid or its ester, thus avoiding the necessity of opening the reactor, and adding the toluic acid or its esters after the carbonylation reaction.

In general, excess carbon monoxide is utilized in the carbonylation reaction over that required by the stoichiometry of the reaction and, accordingly, after the carbonylation reaction has been completed the excess carbon monoxide can be vented. During or after the alkylation reaction the reactor is vented to remove the carbon monoxide produced by the alkylation reaction. The product is recovered by conventional methods; for example, the reaction mixture is diluted with ice and water or with water alone and filtered to obtain the solid acids or esters. These may be dissolved with a suitable solvent such as diethyl ether, carbon tetrachloride, or chloroform; the solvent layer is washed with water and the solvent removed by distillation. In the case of the acid, the solvent layer is extracted with alkali, and the neutralized acid or "soap" is then extracted with diethyl ether, hydrocarbon or chlorinated hydrocarbon to remove traces of impurities; finally the acid is produced by acidification with concentrated hydrochloric acid.

The following examples are provided to illustrate the invention and should not be considered limiting.

EXAMPLE I

One mole of methylcyclohexene was sparged over a period of 30 minutes into a solution of 0.5 mole ortho-toluic acid in 400 g. of 96 percent $H_2SO_4$ contained in a 1-liter stirring autoclave pressured with carbon monoxide (1000 p.s.i.g.) and maintained at 25±5° C. Stirring was continued until the pressure drop had ceased. The excess carbon monoxide was vented. The autoclave was then heated at atmospheric pressure with stirring at 80° for 4 hours during which 0.7 c.f. of gas, mainly carbon monoxide, was vented. The product was recovered as described above and it was found that a 40 percent yield of 5-(1-methylcyclohexyl)-2-methylbenzoic acid was obtained.

EXAMPLE II

When isobutylene or isoamylene are employed as the olefins in the method of Example I there is produced the corresponding tertiary butyl or tertiary amyl alkylated derivative of the ortho-toluic acid.

EXAMPLE III

When hydrofluoric acid is substituted for the sulfuric acid catalyst of Examples I and II, similar excellent yields of the tertiary alkylated toluic acid are obtained.

EXAMPLE IV

When the lower alkyl esters of ortho-toluic acid, i.e. the alkyl group contains from 1 to 4 carbon atoms, are substituted for the ortho-toluic acid in the foregoing examples, the corresponding tertiary alkylated ortho-toluic acid esters are obtained.

We claim:
1. A method for the production of tertiary alkyl derivatives of ortho-toluic acid and the lower alkyl esters thereof which comprises carbonylating an olefin selected from the group consisting of isobutylene, isoamylene, methylcyclopentene and methylcyclohexene at a temperature in the range of from about 0° to 60° C. with carbon monoxide in the presence of a mineral acid catalyst and thereafter heating the resulting carbonylate and ortho-toluic acid or lower alkyl ester thereof at a temperature of from about 60° C. to 150° C. to produce the tertiary alkyl derivative of said ortho-toluic acid or ester and carbon monoxide.

2. The method according to claim 1, wherein said mineral acid catalyst is selected from the group consisting of sulfuric acid and hydrofluoric acid having a concentration in the range of from 90 to 100 percent.

3. The method according to claim 2, wherein said acid is sulfuric acid.

4. The method according to claim 1, wherein said acid is hydrofluoric acid.

5. The method according to claim 1, wherein said olefin is isobutylene.

6. The method according to claim 1, wherein said olefin is isoamylene.

7. The method according to claim 1, wherein said olefin is methylcyclopentene.

8. The method according to claim 1, wherein said olefin is methylcyclohexene.

9. The method according to claim 1, wherein ortho-toluic acid is alkylated.

References Cited
UNITED STATES PATENTS 3,050,554  8/1962  Porter et al. _____ 260—525

JAMES A. PATTEN, Primary Examiner

U.S. Cl. X.R.

260—476 R